United States Patent [19]

Cook

[11] Patent Number: 4,495,928

[45] Date of Patent: Jan. 29, 1985

[54] COMBINATION FUEL HEATER AND FUEL FILTER DEVICE

[76] Inventor: William R. Cook, Rte. #1, Wellington, Kans. 67412

[21] Appl. No.: 530,420

[22] Filed: Sep. 8, 1983

[51] Int. Cl.³ ............................................. F02M 31/00
[52] U.S. Cl. ...................................... 123/557; 210/184
[58] Field of Search ............... 123/557; 210/180, 183, 210/181, 184, 186, 177, 416.4

[56] References Cited

U.S. PATENT DOCUMENTS

| | | | |
|---|---|---|---|
| 1,623,074 | 4/1927 | Tartrais | 123/557 |
| 2,068,395 | 1/1937 | Burckhalter | 210/181 |
| 2,355,693 | 8/1944 | Aldrich | 123/557 |
| 4,003,356 | 1/1977 | Naylor | 123/557 |
| 4,342,303 | 8/1982 | McCord | 123/557 |
| 4,395,996 | 8/1983 | Davis | 123/557 |

FOREIGN PATENT DOCUMENTS 880040 6/1953 Fed. Rep. of Germany ...... 210/183

*Primary Examiner*—Ronald H. Lazarus
*Attorney, Agent, or Firm*—Edwin H. Crabtree

[57] ABSTRACT

A combination fuel heater and fuel filter for improving fuel consumption in an internal combustion engine. The heater and filter device provides heated and cleaned fuel prior to the fuel being introduced to the engine's carburator.

2 Claims, 4 Drawing Figures

COMBINATION FUEL HEATER AND FUEL FILTER DEVICE

BACKGROUND OF THE INVENTION

This invention relates to a fuel heater and more particularly but not by way of limitation to a combination of a fuel heater and fuel filter for improving fuel consumption in an internal combustion engine.

Heretofore, there have been various types of fuel heaters and filters used for preheating fuel prior to introduction into the engine's carburetor. These devices are disclosed in the following U.S. Patents: U.S. Pat. No. 3,929,187 to Hurner, U.S. Pat. No. 4,072,138 to Hawkins et al, U.S. Pat. No. 3,951,124 to Fairbanks, U.S. Pat. No. 4,083,340 to Furr U.S. Pat. No. 4,091,782 to Dunnam and U.S. Pat. No. 3,110,296 to Lundi.

None of the above mentioned patents particularly point out the unique features and above advantages of the subject heater and filter device as described herein.

SUMMARY OF THE INVENTION

The combination fuel heater and fuel filter device is simple in design, may be installed on various types of internal combustion engines and greatly decreases fuel consumption by preheating and cleaning the fuel prior to the fuel being introduced to the carburetor of the engine.

Further the device may be quickly installed on various types of vehicles having internal combustion engines of stationary mounted engines.

It has been found by using the subject invention, the size of fuel jets in the engine's carburetor can be reduced without losing power or performance thereby decreasing fuel consumption with improved vehicle mileage per gallon of fuel used.

The device is inexpensive, safe and includes no moving parts requiring maintenance thereon.

The device uses the vehicle's existing fuel line and water heater hose for heating the fuel prior to receipt in the engine's carburetor.

The combination fuel heater and fuel filter includes a fuel housing having a first end portion and a threaded second end portion. A fuel inlet is connected to the first end portion of the housing for receiving fuel from the fuel line. A hot water tube is received in the housing and runs along the length of the housing for heating the fuel when it is received in the housing. A threaded end cap is connected to the second end portion of the housing and includes a fluid outlet for connection to the fuel line going to the carburetor. The threaded end cap also receives a fuel filter therein for filtering the heated fuel prior to discharge.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
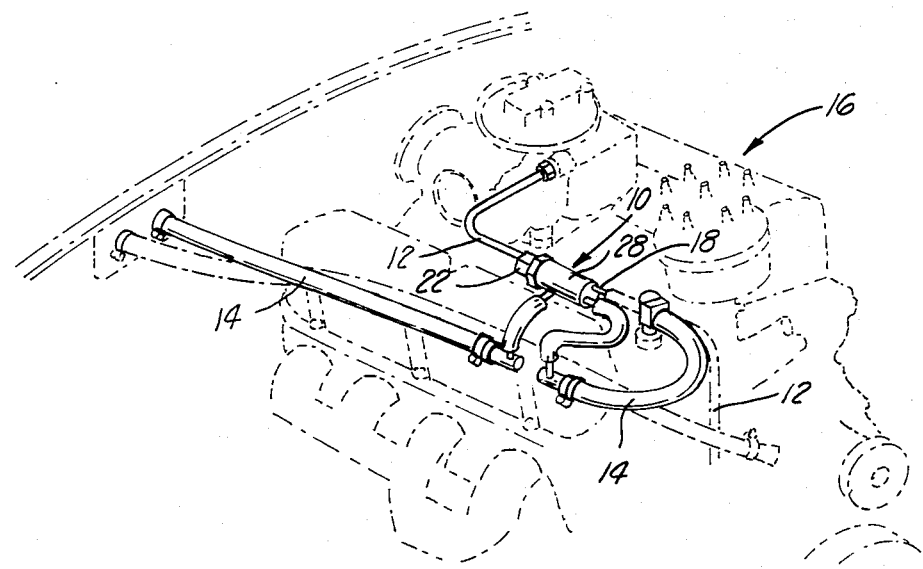
FIG. 1 is a perspective view of a standard internal combustion engine with the combination fuel heater and fuel filter device connected to the water heater hose and fuel line.

In FIG. 1 a perspective view of the fuel heater and fuel filter device is shown and designated by general reference numeral 10. The device 10 is shown connected to a fuel line 12 and a water heater hose 14 which are connected to a typical internal combustion engine shown in dotted lines and designated by general reference numeral 16. The device 10 can be quickly mounted by separating the fuel line 12 and connecting the line 12 using typical hose connections to a fuel inlet 18 and a fuel outlet 20 connected to a threaded end cap 22. Likewise, the hot water heater hose 14 can be separated and using typical hose connections connected to a hot water tube 24.

Figure 2:
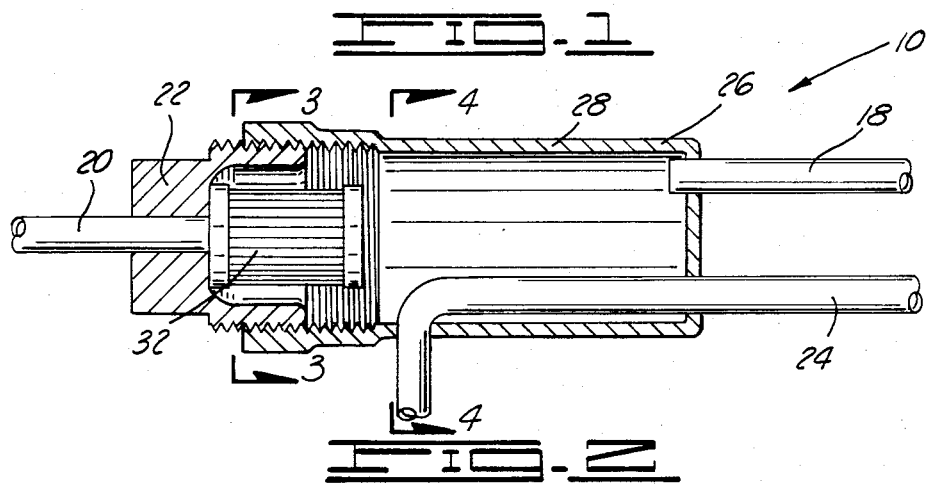
FIG. 2 is a side sectional view of the device.

The hot water tube is received in a first end portion 26 of a cylindrical shaped fuel housing 28. The housing 28 shown in cross section in FIG. 2 includes a threaded second end portion 30 for receiving the cap 22 therein. The threaded cap 22 receives a fuel filter 32 therein.

Figure 3:
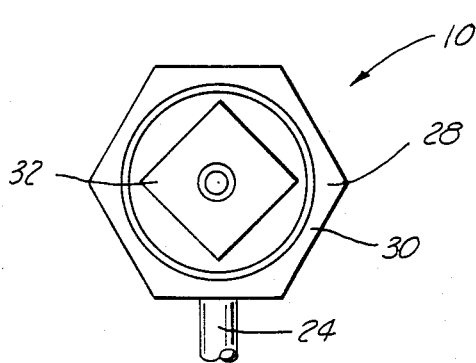
FIG. 3 is an end view of the device taken along lines 3—3.
Figure 4:
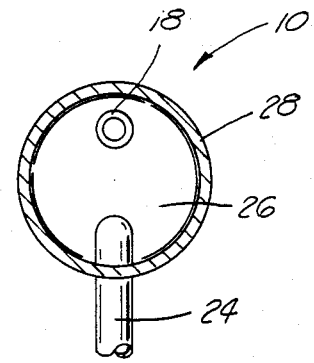
FIG. 4 is an end sectional view taken along line 4—4 shown in FIG. 2.

In FIG. 3 the cap 22 has been removed to expose an end view of the filter 32 inside the cylindrical housing 28. Also in FIG. 4 an end sectional view of the housing 28 is seen with the inlet 18 received in the first end portion 26 of the housing 28. Also the water tube 24 can be seen extending down from the side of the housing 28.

In operation the device 10 can be installed by separating the water hose 14 and fuel line 12 and using standard hose couplings connect the hose 14 to the water tube 24 and the fuel line 12 to the fuel inlet 18 and fuel outlet 20.

The water tube 24 runs along the length and inside of the housing 28 and is dimensioned to provide the necessary heat to the fuel received therein. The heated fuel is then received through the filter 32 prior to discharge out the fuel outlet 20. Should the filter 32 need to be changed, the cap 22 can be quickly removed for replacing the filter 32 therein.

It should be noted that the water tube 24 should have a diameter in the range of ¼ inches to 5/16 inches with the diameter of the housing 28 being approximately 1 inch. By having a ratio of approximately 4 to 1 or 3 to 1 of the diameter of the housing 28 to the water tube 24, the fuel is properly heated without vaporizing the fuel before it enters the carburetor.

Changes may be made in the construction and arrangement of the parts or elements of the embodiments as described herein without departing from the spirit or scope of the invention defined in the following claims.

What is claimed is:

1. A combination fuel heater and fuel filter device for improving fuel consumption in an internal combustion engine, the heater and fuel filter adapted for attachment to the engine's water heater hose and fuel line, the device comprising:

a fuel housing, cylindrical in shape and having a first end portion and a threaded second end portion;

a fuel inlet in the first end portion of the housing and adapted for connection to the fuel line and receiving fuel in the housing;

a hot water tube received in the housing and running along the length of the housing, one end of the tube extending outwardly from the first end portion of the housing and adapted for connection to one end of the water heater hose, the other end of the tube extending outwardly from the side of the housing and adapted for connection to the other end of the water heater hose, the diameter of the tube in a range of ¼ to ⅓ of the diameter of the fuel housing for properly heating without vaporizing the fuel before it enters a carburetor of the engine;

a threaded end cap connected to the threaded second end portion of the housing and having a fuel outlet adapted for connection to the fuel line; and a fuel filter received inside the threaded end cap.

2. A combination fuel heater and fuel filter device for improving fuel consumption in an internal combustion engine, the heater and fuel filter adapted for attachment to the engine's water heater hose and fuel line, the device comprising:

a fuel housing, cylindrical in shape and having a first end portion and a threaded second end portion, the fuel housing having a diameter in the range of 1 inch;

a fuel inlet in the first end portion of the housing and adapted for connection to the fuel line and receiving fuel in the housing;

a hot water tube received in the housing and running along the length of the housing, one end of the tube extending outwardly from the first end portion of the housing and adapted for connection to one end of the water heater hose, the other end of the tube extending outwardly from the side of the housing and adapted for connection to the other end of the water heater hose, the diameter of the hot water tube in the range of ¼ to 5/16 inches so that the fuel is properly heated without vaporizing when the fuel enters a carburetor of the engine;

a threaded end cap connected to the threaded second end portion of the housing and having a fuel outlet adapted for connection to the fuel line; and a fuel filter received inside the threaded end cap.

* * * * *